United States Patent
Gehlot

(10) Patent No.: US 6,657,776 B2
(45) Date of Patent: Dec. 2, 2003

(54) PUMP SOURCE INCLUDING POLARIZATION SCRAMBLING IN RAMAN AMPLIFIED OPTICAL WDM SYSTEMS

(75) Inventor: Narayan L. Gehlot, Sayreville, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/989,884

(22) Filed: Nov. 21, 2001

(65) Prior Publication Data

US 2003/0095321 A1 May 22, 2003

(51) Int. Cl.[7] .............................................. H01S 3/00
(52) U.S. Cl. ................................... 359/334; 359/341.3
(58) Field of Search ............................... 359/334, 341.3

(56) References Cited

U.S. PATENT DOCUMENTS

| | | | |
|---|---|---|---|
| 5,104,222 A | * | 4/1992 | Kersey et al. ............... 356/345 |
| 6,101,297 A | * | 8/2000 | Nakaya .......................... 385/3 |
| 6,122,298 A | | 9/2000 | Kerfoot, III et al. |
| 6,147,794 A | | 11/2000 | Stentz |
| 6,191,877 B1 | | 2/2001 | Chraplyvy et al. |
| 6,266,456 B1 | | 7/2001 | Lee et al. |
| 6,282,002 B1 | | 8/2001 | Grubb et al. |
| 6,342,965 B1 | * | 1/2002 | Kinoshita ................... 359/334 |
| 6,404,542 B1 | * | 6/2002 | Ziari et al. ............... 359/341.3 |

FOREIGN PATENT DOCUMENTS

| EP | 1 022 870 A2 | 7/2000 |
|---|---|---|
| EP | 1 026 797 A2 | 8/2000 |

* cited by examiner

Primary Examiner—Mark Hellner

(57) ABSTRACT

A pump source for a fiber Raman amplifier is formed to include a polarization scrambler to reduce the effects of polarization dependent gain, particularly as used in a multiple input wavelength WDM optical system. The source utilizes a polarization scrambler coupled to the output of a pump laser, the scrambler controlled by a sinusoidal input signal to impart a randomness to the polarization of the pump signal. Thus, a random state of polarization of the pump signal, with respect to the various input signal wavelengths, improves the overall gain experienced by the system.

10 Claims, 2 Drawing Sheets

10

30

PUMP SOURCE INCLUDING POLARIZATION SCRAMBLING IN RAMAN AMPLIFIED OPTICAL WDM SYSTEMS

TECHNICAL FIELD

The present invention relates to Raman amplified optical systems and, more particularly, to WDM optical systems utilizing Raman amplification techniques.

BACKGROUND OF THE INVENTION

The subject of Raman amplification is well-known in the literature. Stimulated Raman amplification is a nonlinear optical process in which an intense pump wave is injected into an optical fiber carrying one or more optical message signals. In fused silica fibers, if the pump wavelength is approximately 100 nm shorter than the signal wavelength, the pump will amplify the signal(s) via stimulated Raman scattering. If the amplification is made to occur in the transmission fiber itself, the amplifier is referred to as a "distributed amplifier". In such a distributed amplifier arrangement the pump can either propagate through the fiber in the same direction as the signal(s) (referred to as a "co-propagating arrangement"), or in the opposite direction (referred to as a "counter-propagating arrangement"). In either case, amplification will occur, although there are well-known and discussed differences between the co- and counter-propagating arrangements.

When using Raman amplification in multiwavelength optical communication systems, pump depletion modulation (PDM) becomes problematic. In particular, crosstalk among wavelength division multiplexed (WDM) channels arises and is caused by a two-step process in which extraction of energy from the initial pump wave by a first modulated channel (e.g., channel "A") modulates the pump by depletion, followed by the now-modulated pump in turn modulating a second channel (e.g., channel "B") also being amplified. The pump-mediated crosstalk is of constant amplitude as the modulation frequency increases, but beyond some threshold, decreases to a tolerable level (in accordance with a relationship dependent on the reciprocal of frequency).

Utilizing a counter-propagating pump source has been found to reduce the PDM effect, but as the number of channels in WDM systems increase, additional PDM-based problems arise. In particular, there is a need to increase the power coupled from the Raman amplifier into the fiber channel to support such a demand for increasing the number of channels. However, this is opposed by an increase in non-linearity penalties in the system. Further, the number of WDM channels requires precise monitoring to remotely extract the pump signal. Most difficult, however, is the fact that the polarization state within a Raman amplifier (i.e., usually several kilometers in length) can change as a function of intrinsic and/or extrinsic stresses, temperature and environmental factors.

One solution to the polarization problem is to use a pair of orthogonal pump lasers, where the output of the pair of lasers is combined using a polarization multiplexer, thus reducing the existence of polarization-dependent gain in the Raman amplifier. However, the cost of using an additional laser may be a significant financial burden and, moreover, the combination of the two pumps may induce beating, which is particularly troublesome in a co-propagating Raman amplifier configuration.

Thus, a need remains in art for an improved pump arrangement for use with Raman amplified systems to minimize the effects of polarization-induced amplification penalties.

SUMMARY OF THE INVENTION

The need remaining in the prior art is addressed by the present invention, which relates to Raman amplified optical systems and, more particularly, to a Raman amplified WDM optical system using a polarization scrambled pump source to reduce the effects of polarization-dependent amplification penalties.

In accordance with the present invention, a pump input signal is subjected to polarization scrambling prior to being injected into the fiber amplifier to guarantee a random state of optical polarization for all input wavelengths within the amplifier. In this manner, the penalties or fluctuations due to the polarization state of the pump will be spread equally among all wavelengths and guarantee better stability.

BRIEF DESCRIPTION OF THE DRAWINGS

Referring now the drawings.

DETAILED DESCRIPTION

Figure 1:
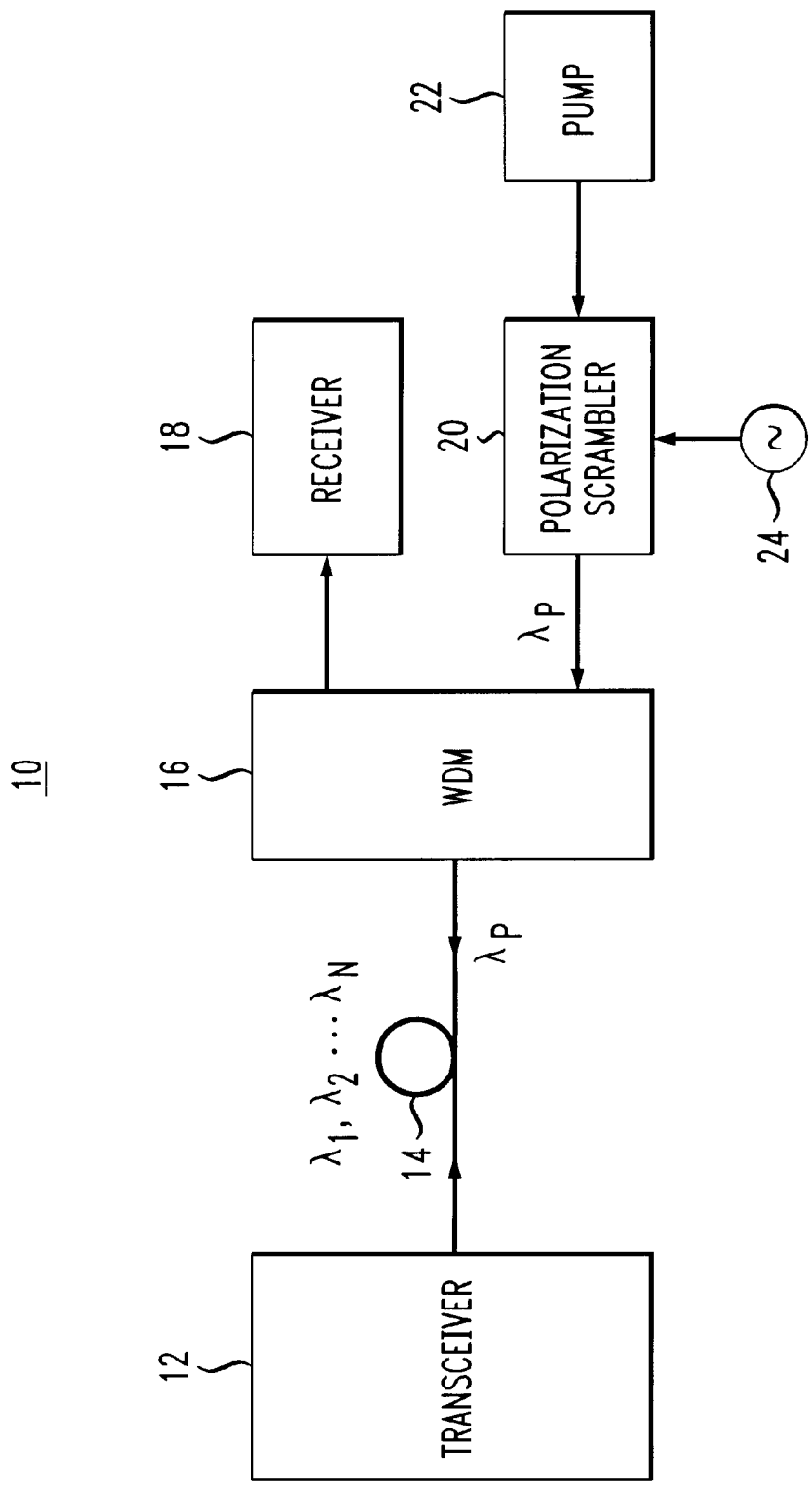
FIG. 1 illustrates a counter-pumped fiber Raman amplifier utilizing a polarization scrambled pump source in accordance with the present invention.

FIG. 1 illustrates an exemplary WDM optical communication system 10 utilizing a polarization randomized pump source for supplying Raman amplification in accordance with the present invention. As shown, a transmitter 12 is used to provide a plurality of N optical input signals, each occupying a different channel. These signals are represented by the notation $\lambda_1, \lambda_2, \ldots \lambda_N$ in FIG. 1. It is to be understood that transmitter 12 may comprise, in fact, a plurality of separate transmitting sources (i.e., lasers), and include a wavelength division multiplexer (WDM), not shown, or other device, to combine all of the transmission signals onto a single optical transmission fiber 14. In an exemplary system which utilizes fiber Raman amplification, the plurality of input optical signals may utilize wavelengths in the range of 1520 nm–1620 nm.

Amplification of the various input signals is provided along the length of transmission fiber 14 by supplying a pump signal, denoted by $\lambda_p$ in FIG. 1. In this particular embodiment, a wavelength division multiplexer 16 is used to couple the pump signal onto transmission fiber 14 in a counter-propagating relationship with respect to the plurality of N input optical signals. An optical pump signal having a wavelength of approximately 1440 nm has been found to provide amplification to optical signals within the range (1520–1620 nm) discussed above. The amplified output signals, operating at wavelengths $\lambda_1, \lambda_2, \ldots \lambda_N$ are thereafter transmitted to one or more units within an optical receiver 18.

As mentioned above, the state of polarization of the pump signal, as well as the state of polarization of the plurality of input optical signals, will vary along the length of transmission fiber 14. Attempts have been made in the past to control the state of polarization of the input signals and/or the pump signal, or use some type of polarization maintaining fiber for the transmission fiber. Polarization-induced effects along the transmission fiber are particularly difficult to address, as mentioned above, in WDM systems which use multiple wavelength input signals, since tailoring the polarization effect for one wavelength may result in degrading the performance associated with another wavelength. However, the crosstalk associated with pump depletion modulation, a result of polarization effects, needs to be addressed.

In accordance with the present invention, therefore, a polarization scrambling element 20 is included in transmission system 10 and is utilized to scramble the polarization state of a pump signal supplied by a pump source 22 prior to coupling the pump signal into transmission fiber 14. The use of scrambling element 20 guarantees that a random state of polarization for the pump signal will be present for each input signal, regardless of its wavelength. It is expected that penalties or fluctuations due to the polarization state of the pump will be spread equally among all of the input wavelengths, thus yielding an improvement in the overall stability of optical transmission system 10.

A sinusoidal signal source 24 is used to provide the scrambling input to polarization scrambling element 20. The sinusoidal frequency used is chosen to be a multiple (or submultiple) of the data rate of the input optical signals. For example, when the input signal comprises a data rate of 1 Gb/s, the sinusoidal frequency applied scrambling element 20 may be 2 Gb/s, 500 Mb/s, or another suitable rate.

Figure 2:
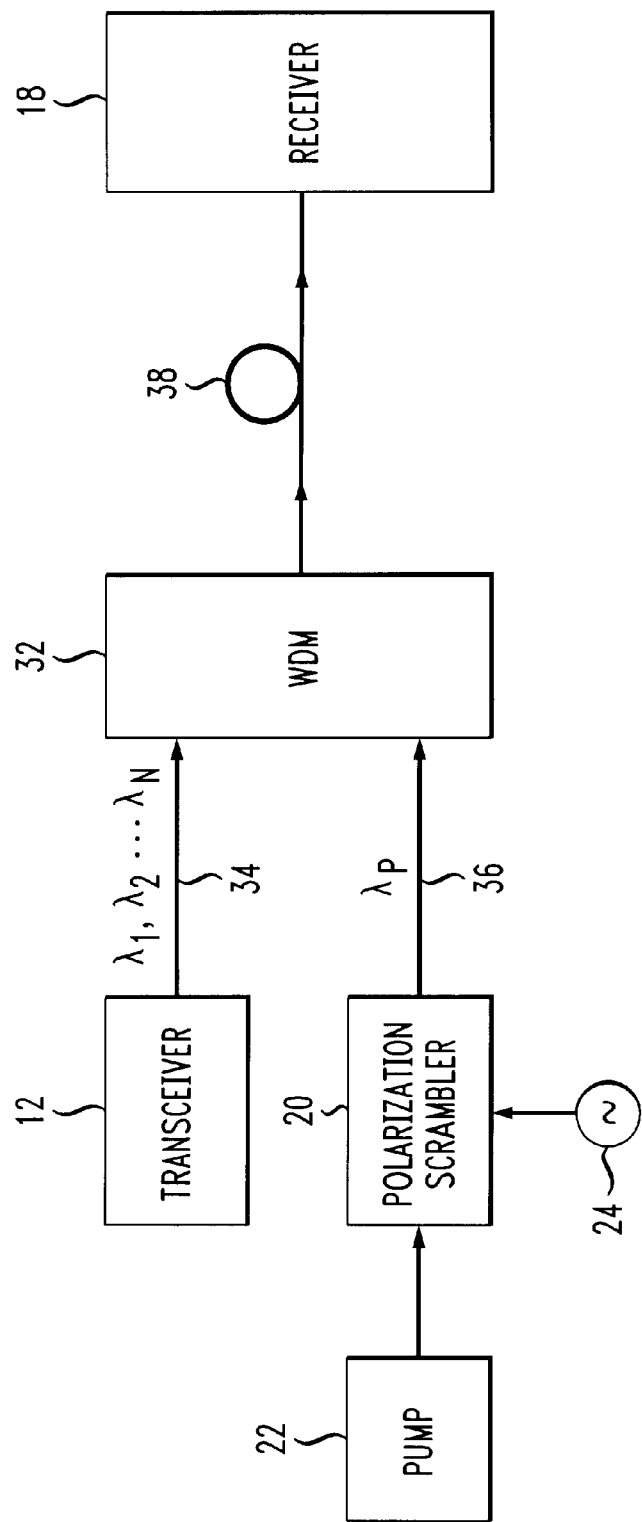
FIG. 2 illustrates a similar arrangement, in this case utilizing a co-propagating polarization scrambled pump source.

As mentioned above, the inventive technique of applying polarization scrambling to the pump signal may also be used in a co-propagating pump arrangement. FIG. 2 illustrates one such optical communication system 30. In this case, the plurality of N input optical signals from transmitter 12 (operating within a wavelength range of, for example, 1520 nm–1620 nm) is applied as a first input to a wavelength division multiplexer 32 along a first optical fiber 34, and the polarization scrambled pump signal (operating at a wavelength of, for example 1440 nm) is applied as the second input to multiplexer 32, along a second optical fiber 36. In this arrangement, therefore, the polarization scrambled pump signal and the plurality of input optical signals will propagate in the same direction along transmission fiber 38, with optical amplification occurring along the length of the fiber. As before, the termination of transmission fiber 38 is coupled to receiver 18 (which may, in some cases, comprise a plurality of separate receiver units).

It is to be understood that the above-described embodiments are illustrative of only selected ones of the many possible specific embodiments which can represent applications of the principles of the invention. Numerous and varied other arrangements can be made in accordance with these principles without departing from the spirit and scope of the invention. For example, optical systems employing both co- and counter-propagating pump signals may utilize polarization scrambling techniques on one or both pump sources.

What is claimed is:

1. An optical transmission system for amplifying a plurality of N input optical signals operating over a wavelength range of $\lambda_1$–$\lambda_N$, the system comprising
    a polarization scrambled pump source for providing an optical pump signal at a predetermined wavelength $\lambda_p$ which exhibits a continuously random state of polarization as a function of time; and
    a transmission optical fiber coupled to both the source of said plurality of N input optical signals and the polarization scrambled pump source for utilizing the polarization scrambled optical pump signal to generate optical amplification in sad plurality of N input optical signals.

2. An optical transmission system as defined in claim 1 wherein the system further comprises
    a wavelength division multiplexer for coupling the polarization scrambled pump signal into the transmission fiber.

3. An optical transmission system as defined in claim 1 wherein the polarization scrambled pump source comprises
    an optical source of the pump signal at the predetermined wavelength;
    a polarization scrambling element; and
    a sinusoidal signal source, wherein the sinusoidal signal source and the optical source are applied as inputs to the polarization scrambling element, the sinusoidal signal used to continuously scramble the state of polarization of the pump signal as a function of time and the output of the polarization scrambling element thereafter coupled to the transmission optical fiber.

4. An optical transmission system as defined in claim 3 wherein the sinusoidal signal source provides an RE signal input at a frequency essentially equal to a multiple of the data rate of the plurality of N input optical signals.

5. An optical transmission system as defined in claim 3 wherein the sinusoidal signal source provides an RF signal input at a frequency essentially equal to a submultiple of the data rate of the plurality of N input optical signals.

6. An optical transmission system as defined in claim 2 wherein the system utilizes a counter-propagating pump signal, with the wavelength division multiplexer disposed at the output end of the transmission fiber and the polarization scrambled pump source coupled to said transmission fiber so as to propagate the polarization scrambled pump signal in a direction opposite of the plurality of N input optical signals.

7. An optical transmission system as defined in claim 2 wherein the system utilizes a co-propagating pump signal, with the wavelength division multiplexer disposed at the input end of the transmission fiber and the polarization scrambled pump source coupled to said transmission fiber so as to propagate the polarization scrambled pump signal in the same direction as the plurality of N input optical signals.

8. An optical transmission system as defined in claim 1 wherein the plurality of N input optical signals operate over a wavelength range of approximately 1520 nm–1620 nm.

9. An optical transmission system as defined in claim 7 wherein the pump signal comprises a predetermined wavelength of approximately 1440 nm.

10. A method of reducing polarization-dependent penalties in a fiber Raman amplifier, the method comprising the steps of:
    providing a continuous wave (CW) optical pump signal for supplying amplification to a plurality of optical information signals;
    continuously scrambling the polarization state of the CW optical pump signal as a of time; and
    coupling the polarization scrambled optical pump signal to the plurality of optical information signals in an optical transmission fiber to generate polarization-independent amplification of said plurality of optical information signals.

* * * * *